United States Patent

Khan et al.

(12) 
(10) Patent No.: US 6,746,656 B2
(45) Date of Patent: Jun. 8, 2004

(54) METHODS FOR PRODUCTION OF MOLYBDENUM CARBIDE

(75) Inventors: Mohamed H. Khan, Tucson, AZ (US); Joel A. Taube, Donnellson, IA (US)

(73) Assignee: Cyprus Amax Minerals Company, Phoenix, AZ (US)

( * ) Notice: Subject to any disclaimer, the term of this patent is extended or adjusted under 35 U.S.C. 154(b) by 162 days.

(21) Appl. No.: 10/007,349

(22) Filed: Nov. 7, 2001

(65) Prior Publication Data

US 2003/0086857 A1 May 8, 2003

(51) Int. Cl.$^7$ ............................................. C01B 31/34
(52) U.S. Cl. .................... 423/345; 423/440; 502/177
(58) Field of Search ................. 502/177, 182; 423/345, 414, 439, 440

(56) References Cited

U.S. PATENT DOCUMENTS

| | | | |
|---|---|---|---|
| 2,402,084 A | | 6/1946 | Rennie |
| 3,077,385 A | * | 2/1963 | Robb ........................ 423/440 |
| 4,331,544 A | * | 5/1982 | Takaya et al. .............. 502/177 |
| 4,515,763 A | | 5/1985 | Boudart et al. |
| 4,851,206 A | * | 7/1989 | Boudart et al. ............. 423/409 |
| 6,042,370 A | | 3/2000 | Weide |
| 6,207,609 B1 | | 3/2001 | Gao et al. ................... 502/177 |

FOREIGN PATENT DOCUMENTS

| | | |
|---|---|---|
| EP | 1088788 A2 | 4/2001 |
| EP | 1162281 A1 | 12/2001 |

OTHER PUBLICATIONS

Search Report in corresponding EPO Patent Application Serial No. 02022648.6–2122 of Cyprus Amax Minerals Company.

"Molybdenum Carbide Catalysts; II. Topotactic Synthesis of Unsupported Powders," Lee, J. S., et al., 6113 Journal of Catalysis, vol. 112 (Jul. 1988), No. 1, pp. 44–53.

Studies in Inorganic Chemistry 19, "Molybdenum: An Outline of its Chemistry and Uses" by E.R. Braithwaite and J. Haber, 1994, pp. 14–15, 25–26, 73–75, 147, 148, 150.

\* cited by examiner

*Primary Examiner*—Steven Bos
*Assistant Examiner*—Anthony Kuhar
(74) *Attorney, Agent, or Firm*—Bruce E. Dahl; Dahl & Osterloth L.L.P.

(57) ABSTRACT

Methods for producing molybdenum carbide. An embodiment of the method may comprise heating a precursor material in a first heating zone in the presence of a reducing gas and a carbonizing gas, the first heating zone having a first temperature. Moving the precursor material into a second heating zone to form the molybdenum carbide from the precursor material, the second heating zone having a second temperature, the second temperature being at least 100° C. hotter than the first temperature.

19 Claims, 3 Drawing Sheets

METHODS FOR PRODUCTION OF MOLYBDENUM CARBIDE

FIELD OF THE INVENTION

The invention generally pertains to molybdenum carbides, and more specifically, to apparatus and methods for production of molybdenum carbide.

BACKGROUND OF THE INVENTION

Hydrogen reacts with oxygen to generate energy while producing water instead of the pollutants typically associated with the combustion of fossil fuels. Therefore, hydrogen is potentially a significant source of "clean" energy. Among other uses, hydrogen is also used on an industrial basis for chemical synthesis (e.g., methanol and ammonia synthesis).

Sources of hydrogen include methane, a significant component of relatively abundant natural gas. Processes such as steam reforming and dry reforming of methane may be used to produce hydrogen gas and carbon monoxide. However, the catalysts required for these reactions are typically made of expensive noble metals, such as elemental gold, platinum, iridium, ruthenium, and nickel. In addition, these catalysts must be replaced frequently as they tend to become plugged and eventually deactivated by carbon deposits. Molybdenum carbides (MoC and/or $Mo_2C$) have been shown to be a viable and less expensive alternative to noble metal catalysts for a variety of reactions, including oxidation of methane to form hydrogen gas.

Various processes have been developed for producing molybdenum carbide. According to one such process for producing $Mo_2C$, ammonium molybdate powder is loaded into a quartz liner and placed into a rotary kiln. The system is first purged with nitrogen, then a hydrogen and carbon monoxide mixture is introduced. Initially, the temperature is set to 300° C. to decompose the ammonium molybdate. Thereafter, the temperature may only be ramped between 2° C. and 20° C. per minute. The $Mo_2C$ forms during a three to five hour soak at a temperature between 550° C. and 600° C. The reactor is then cooled, and the $Mo_2C$ powder may be passivated with diluted oxygen or air after the powder cools to room temperature.

However, this process for producing molybdenum carbide requires the temperature ramp rate not exceed 20° C. per minute, and is thus a time-consuming process. In addition, this is a batch process, which slows production and increases production costs.

SUMMARY OF THE INVENTION

An embodiment of a method for producing molybdenum carbide may comprise the steps of: heating a precursor material in a first heating zone in the presence of a reducing gas and a carbonizing gas, the first heating zone having a first temperature; and moving the precursor material into a second heating zone to form the molybdenum carbide from the precursor material, the second heating zone having a second temperature, the second temperature being at least 100° C. hotter than the first temperature.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
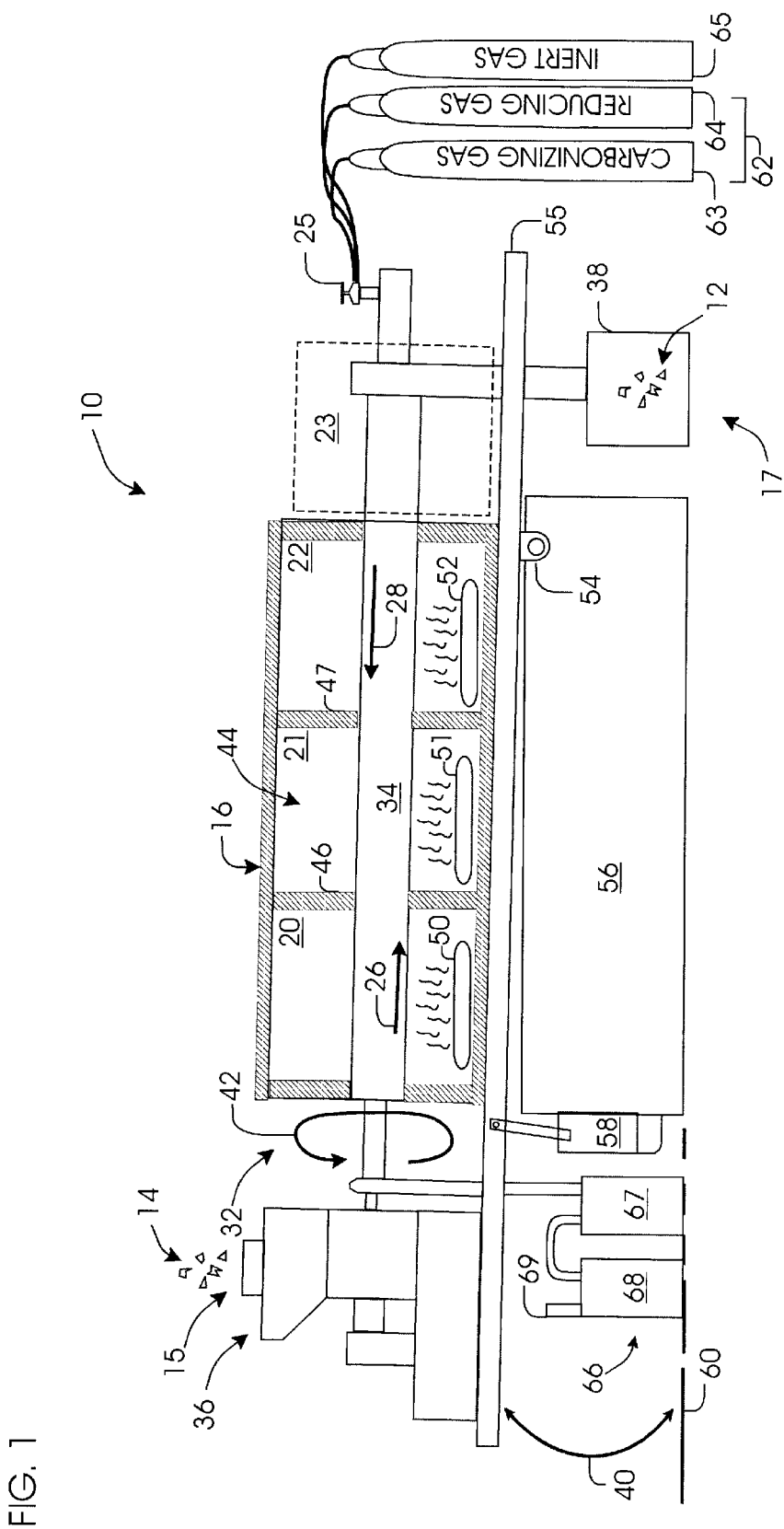
FIG. 1 is a cross-sectional schematic representation of one embodiment of apparatus for producing molybdenum carbide according to the invention.

Apparatus 10 (FIG. 1) is shown and described herein as it may be used to produce molybdenum carbide 12. Briefly, molybdenum carbides (MoC and/or $Mo_2C$) offer a viable and less expensive alternative to noble metal catalysts for a variety of reactions, including the production of hydrogen. Although various processes have been developed for producing molybdenum carbides, these tend to be non-continuous and slow. For example, one batch process for producing $Mo_2C$ requires the temperature ramp rate not exceed 20° C. per minute. Instead, it is desirable to produce molybdenum carbide on a continuous, and hence cost-effective basis, particularly for industrial or commercial applications.

According to the teachings of the invention, embodiments of apparatus 10 for producing molybdenum carbide 12 are disclosed. Apparatus 10 may comprise a process gas 62, and a process chamber 34. The precursor material 14 (e.g., $MoO_3$) and the process gas 62 (e.g., a mixture of hydrogen and carbon monoxide gasses) are received in the process chamber 34. For example, for MoC production, the process chamber 34 may comprise heating zones 20, 21, and 22, wherein the first heating zone 20 is heated to about 555° C., and the second and third heating zones 21 and 22 are each heated to about 900° C. Or for example, for $Mo_2C$ production, the process chamber 34 may comprise heating zones 20, 21, and 22, wherein the first heating zone 20 is heated to about 555° C., the second heating zone 21 is heated to about 800° C., and the third heating zone 22 is heated to about 1000° C. In any event, the precursor material 14 reacts with the process gas 62 within the process chamber 34 to form molybdenum carbide product 12.

Apparatus 10 may be operated as follows for producing molybdenum carbide 12 from a precursor material 14 (e.g., molybdic oxide ($MoO_3$)). As one step in the process, the precursor material is heated in a first temperature zone (e.g., in Heating Zone 1 of furnace 16) in the presence of a reducing gas 64 and a carbonizing gas 63. Thereafter, the precursor material is moved to a second heating zone (e.g., in Heating Zone 2) that is at a temperature at least 1000° C. greater than the first heating zone to form the molybdenum carbide product 12.

Accordingly, the apparatus and method may be used to produce MoC and $Mo_2C$ in a continuous manner. Preferably, no intermediate handling is required during production of the molybdenum carbide product 12. That is, the precursor material 14 is preferably fed into a product inlet end 15 of furnace 16, and the molybdenum carbide product 12 is removed from a product discharge end 17 of furnace 16, allowing the molybdenum carbide to be produced in about three hours. As such, production of molybdenum carbide 12 according to embodiments of the invention is less labor intensive, less time consuming, and production costs may be lower than conventional processes for producing molybdenum carbide.

Having generally described apparatus and methods for production of molybdenum carbide, as well as some of the more significant features and advantages of the invention, the various embodiments of the invention will now be described in further detail.

Apparatus for Producing Molybdenum Carbide

An embodiment of apparatus 10 for producing molybdenum carbide 12 (i.e., MoC and/or $Mo_2C$) according to embodiments of the invention is shown in FIG. 1. As an overview, the apparatus 10 may generally comprise a furnace 16, a transfer system 32, and a process gas 62, each of which will be explained in further detail below. The transfer system 32 may be used to introduce a precursor material 14 into the furnace 16 and move it through the furnace 16, for example, in the direction illustrated by arrow 26. In addition, the process gas 62 may be introduced into the furnace 16, for example, in the direction illustrated by arrow 28. Accordingly, the process gas 62 reacts with the precursor material 14 in the furnace 16 to form molybdenum carbide product 12, as explained in more detail below with respect to embodiments of the method of the invention.

A preferred embodiment of apparatus 10 is shown in FIG. 1 and described with respect thereto. Apparatus 10 preferably comprises a rotating tube furnace 16. Accordingly, the transfer system 32 may comprise at least a process chamber 34 extending through three heating zones 20, 21, and 22 of the furnace 16, and through a cooling zone 23. In addition, the transfer system 32 may also comprise a feed system 36 for feeding the precursor material 14 into the process chamber 34, and a discharge hopper 38 at the far end of the process chamber 34 for collecting the molybdenum carbide product 12 that is produced in the process chamber 34.

Before beginning a more detailed description of preferred embodiments of apparatus 10, however, it should be clear that other embodiments of the furnace 16 and the transfer system 32 are contemplated as being within the scope of the invention. The furnace may comprise any suitable furnace or design thereof, and is not limited to the rotating tube furnace 16, shown in FIG. 1 and described in more detail below. For example, according to other embodiments of the invention, the furnace 16 may also comprise, but is not limited to, more than one distinct furnace (e.g., instead of the single furnace 16 having separate heating zones 20, 21, 22 that are defined by refractory dams 46 and 47). Likewise, the transfer system 32, shown in FIG. 1 and described in more detail below, may comprise a variety of other means for introducing the precursor material 14 into the furnace 16, for moving the precursor material 14 through the furnace 16, and/or for collecting the molybdenum carbide product 12 from the furnace 16. For example, in other embodiments the transfer system 32 may comprise manual introduction (not shown) of the precursor material 14 into the furnace 16, a conveyor belt (not shown) for moving the precursor material 14 through the furnace 16, and/or a mechanical collection arm (not shown) for removing the molybdenum carbide product 12 from the furnace 16. Other embodiments of the furnace 16, and the transfer system 32, now known or later developed, are also contemplated as being within the scope of the invention, as will become readily apparent from the following detailed description of preferred embodiments of apparatus 10.

Turning now to a detailed description of preferred embodiments of apparatus 10, a feed system 36 may be operatively associated with the process chamber 34. The feed system 36 may continuously introduce the precursor material 14 into the furnace 16. In addition, the feed system 36 may also introduce the precursor material 14 into the furnace 16 at a constant rate. For example, the feed system 36 may comprise a loss-in-weight feed system for continuously introducing the precursor material 14 into one end of the process chamber 34 at a constant rate.

It is understood that according to other embodiments of the invention, the precursor material 14 may be otherwise introduced into the furnace 16. For example, the feed system 36 may feed the precursor material 14 into the furnace 16 on an intermittent basis or in batch. Other designs for the feed system 36 are also contemplated as being within the scope of the invention and may differ depending upon design considerations and process parameters, such as the desired rate of production of the molybdenum carbide product 12.

In any event, the precursor material 14 is preferably introduced into the furnace 16 by feeding it into the process chamber 34. The process chamber 34 preferably extends through a chamber 44 that is formed within the furnace 16. The process chamber 34 may be positioned within the chamber 44 so as to extend substantially through each of the heating zones 20, 21, and 22 of the furnace 16. Preferably, the process chamber 34 extends in approximately equal portions through each of the heating zones 20, 21, and 22, although this is not required. In addition, the process chamber 34 may further extend beyond the heating zones 20, 21, and 22 of the furnace 16 and through a cooling zone 23.

According to preferred embodiments of the invention, the process chamber 34 is a gas-tight, high temperature (HT) alloy process chamber. The process chamber 34 also preferably has a nominal external diameter of about 16.5 centimeters (cm) (about 6.5 inches (in)), a nominal internal diameter of about 15.2 cm (about 6 in), and is about 305 cm (about 120 in) long. Preferably, about 50.8 cm (about 20 in) segments of the process chamber 34 each extend through each of the three heating zones 20, 21, and 22 of the furnace 16, and the remaining approximately 152.4 cm (60 in) of the process chamber 34 extend through the cooling zone 23.

In other embodiments of the invention, however, the process chamber 34 may be manufactured from any suitable material. In addition, the process chamber 34 need not extend equally through each of the heating zones 20, 21, and 22 and/or the cooling zone 23. Likewise, the process chamber 34 may be any suitable length and diameter. The precise design of the process chamber 34 will depend instead on design considerations, such as the feed rate of the precursor material 14, the desired production rate of the molybdenum carbide product 12, the temperature for each heating zone 20, 21, and 22, among other design considerations readily apparent to one skilled in the art based on the teachings of the invention.

The process chamber 34 is preferably rotated within the chamber 44 of the furnace 16. For example, the transfer system 32 may comprise a suitable drive assembly operatively associated with the process chamber 34. The drive assembly may be operated to rotate the process chamber 34 in either a clockwise or counter-clockwise direction, as illustrated by arrow 42 in FIG. 1. Preferably, the process chamber 34 is rotated at a constant rate. The rate is preferably selected from the range of approximately 18 to 100 seconds per revolution. For example, the process chamber 34 may be rotated at a constant rate of 18 seconds per revolution. However, the process chamber 34 may be rotated faster, slower and/or at variable rotational speeds, as required depending on design considerations, desired product size, and the set points of other process variables as would be apparent to persons having ordinary skill in the art after having become familiar with the teachings of the invention.

The rotation 42 of the process chamber 34 may facilitate movement of the precursor material 14 and the intermediate material 30 (FIG. 2) through the heating zones 20, 21, and 22 of the furnace 16, and through the cooling zone 23. In addition, the rotation 42 of the process chamber 34 may facilitate mixing of the precursor material 14 and the intermediate material 30. As such, the unreacted portion of the precursor material 14 and the intermediate material 30 is continuously exposed for contact with the process gas 62. Thus, the mixing may further enhance the reaction between the precursor material 14 and the intermediate material 30 and the process gas 62.

In addition, the process chamber 34 is preferably positioned at an incline 40 within the chamber 44 of the furnace 16. One embodiment for inclining the process chamber 34 is illustrated in FIG. 1. According to this embodiment of the invention, the process chamber 34 may be assembled on a platform 55, and the platform 55 may be hinged to a base 56 so that the platform 55 may pivot about an axis 54. A lift assembly 58 may also engage the platform 55. The lift assembly 58 may be operated to raise or lower one end of the platform 55 with respect to the base 56. As the platform 55 is raised or lowered, the platform 55 rotates or pivots about the axis 54. Accordingly, the platform 55, and hence the process chamber 34, may be adjusted to the desired incline 40 with respect to the grade 60.

Although preferred embodiments for adjusting the incline 40 of the process chamber 34 are shown and described herein with respect to apparatus 10 in FIG. 1, it is understood that the process chamber 34 may be adjusted to the desired incline 40 according to any suitable manner. For example, the process chamber 34 may be fixed at the desired incline 40 and thus need not be adjustably inclined. As another example, the process chamber 34 may be inclined independently of the furnace 16, and/or the other components of apparatus 10 (e.g., feed system 36). Other embodiments for inclining the process chamber 34 are also contemplated as being within the scope of the invention, and will become readily apparent to one skilled in the art based upon an understanding of the invention.

In any event, the incline 40 of the process chamber 34 may also facilitate movement of the precursor material 14 and intermediate material 30 through the heating zones 20, 21, and 22 of the furnace 16, and through the cooling zone 23. In addition, the incline 40 of the process chamber 34 may facilitate mixing of the precursor material 14 and intermediate material 30 within the process chamber 34, and expose the same for contact with the process gas 62 to enhance the reactions between the precursor material 14 and/or the intermediate material 30 and the process gas 62. Indeed, the combination of the rotation 42 and the incline 40 of the process chamber 34 may further enhance the reactions for forming molybdenum carbide product 12.

As previously discussed, the furnace 16 preferably comprises a chamber 44 formed therein. The chamber 44 defines a number of controlled temperature zones surrounding the process chamber 34 within the furnace 16. In one embodiment, three temperature zones 20, 21, and 22 are defined by refractory dams 46 and 47. The refractory dams 46 and 47 are preferably closely spaced to the process chamber 34 so as to discourage the formation of convection currents between the temperature zones. In one embodiment, for example, the refractory dams 46 and 47 come to within approximately 1.3 to 1.9 cm (0.5 to 0.75 in) from the process chamber 34 to define three heating zones 20, 21, and 22 in the furnace 16. In any event, each of the three heating zones are preferably respectively maintained at the desired temperatures within the chamber 44 of the furnace 16. And hence, each segment of the process chamber 34 is also maintained at the desired temperature, as shown in more detail in FIG. 2 discussed below.

Preferably, the chamber 44 of the furnace 16 defines the three heating zones 20, 21, and 22 shown and described herein with respect to FIG. 1. Accordingly, the precursor material 14 may be subjected to different reaction temperatures as it is moved through each of the heating zones 20, 21, and 22 in the process chamber 34. That is, as the precursor material 14 is moved through the process chamber 34 and into the first heating zone 20, the precursor material 14 is subjected to the temperature maintained within the first heating zone. Likewise, as the precursor material 14 is moved through the process chamber 34 from the first heating zone 20 and into the second heating zone 21, it is subjected to the temperature maintained within the second heating zone.

It is understood that the heating zones 20, 21, and 22 may be defined in any suitable manner. For example, the heating zones 20, 21, and 22 may be defined by baffles (not shown), by a number of separate chambers (not shown), etc. Indeed, the heating zones 20, 21, and 22 need not necessarily be defined by refractory dams 46, 47, or the like. As an example, the process chamber 34 may extend through separate, consecutive furnaces (not shown). As another example, the chamber 44 of the furnace 16 may be open and a temperature gradient may be generated within the chamber 44 to extend from one end of the chamber 44 to the opposite end of the chamber 44 using separate heating elements spaced along the length thereof.

It is also understood that more than three heating zones (not shown) may be defined within the furnace 16. According to yet other embodiments of the invention, fewer than three heating zones (also not shown) may be defined in the furnace 16. For example, according to one embodiment of the method of the invention, discussed in more detail below, the temperature of Heating Zone 2 (21) and Heating Zone 3 (22) are approximately the same. In such an embodiment, these heating zones may be combined into a single heating zone (e.g., by removing the refractory dam 47 therebetween). Still other embodiments will occur to those skilled in the art based on the teachings of the invention and are also contemplated as being within the scope of the invention.

The furnace 16 may be maintained at the desired temperatures using suitable temperature control means. In preferred embodiments, each of the heating zones 20, 21, and 22 of the furnace 16 are respectively maintained at the desired temperatures using suitable heat sources, temperature control, and over-temperature protection. For example, the heat source may comprise independently controlled heating elements 50, 51, and 52 positioned within each of the heating zones 20, 21, and 22 of the furnace 16, and linked to suitable control circuitry.

In one preferred embodiment, the temperature is regulated within the three heating zones 20, 21, and 22 of the furnace 16 by twenty-eight silicon-carbide, electrical-resistance heating elements. The heating elements are linked to three Honeywell UDC3000 Microprocessor Temperature Controllers (i.e., one controller for each of the three heating zones 20, 21, and 22) for setting and controlling the temperature thereof. In addition, three Honeywell UDC2000 Microprocessor Temperature Limiters (i.e., also one controller for each of the three heating zones 20, 21, and 22) are provided for over-temperature protection. It is understood, however, that any suitable temperature regulating means may be used to set and maintain the desired temperature within the furnace 16. For example, the heating elements need not necessarily be electronically controlled and may instead be manually controlled.

Although each of the heating zones are preferably maintained at relatively uniform temperatures, respectively, it is apparent that conduction and convection of heat may cause a temperature gradient to be established within one or more of the heating zones 20, 21, and 22. For example, although the refractory dams 46, 47 are spaced approximately 1.3 to 1.9 cm (0.5 to 0.75 in) from the process chamber 34 to reduce or minimize the transfer or exchange of heat between the heating zones 20, 21, and 22, some heat exchange may still occur therebetween. Also for example, the process chamber 34 and/or the precursor material and/or intermediate material may also conduct heat between the heating zones 20, 21, and 22. Therefore, the temperature measured at various points within each of the heating zones 20, 21, and 22 may be several degrees cooler or several degrees warmer (e.g., by about 50 to 100° C.) than the center of the heating zones 20, 21, and 22. Other designs are also contemplated to further reduce the occurrence of these temperature gradients, such as sealing the refractory dams 46, 47 about the process chamber 34. In any event, the temperature settings for each of the heating zones 20, 21, and 22 are preferably measured in the center of each of the heating zones 20, 21, and 22 to more accurately maintain the desired temperature therein.

Preferably, the cooling zone (illustrated by outline 23 in FIG. 1) comprises a portion of the process chamber 34 that is open to the atmosphere. Accordingly, the molybdenum carbide product 12 is allowed to cool prior to being collected in the collection hopper 38. However, according to other embodiments of the invention, the cooling zone 23 may be one or more enclosed portions of apparatus 10. Likewise, suitable temperature regulating means may be used to set and maintain the desired temperature within the enclosed cooling zone 23. For example, a radiator may circulate fluid about the process chamber 34 in cooling zone 23. Or for example, a fan or blower may circulate a cooling gas about the process chamber 34 in cooling zone 23.

The process gas 62 is preferably introduced into the furnace 16 for reaction with the precursor material 14 and the intermediate product 30. According to preferred embodiments of the invention, the process gas 62 may comprise a carbonizing gas 63 and a reducing gas 64. Also according to preferred embodiments, an inert gas 65 may be provided for purging the process chamber 34 before beginning the process (e.g., to remove any oxygen or other contaminants from the process chamber 34), and/or after finishing the process (e.g., for safety reasons such as removing any flammable gasses).

It is understood that the carbonizing gas 63, the reducing gas 64, and the inert gas 65 may be stored in separate gas cylinders near the far end of the process chamber 34, as shown in FIG. 1. Individual gas lines, also shown in FIG. 1, may lead from the separate gas cylinders to a gas inlet 25 at the far end of the process chamber 34. A suitable gas regulator (not shown) may be provided to introduce the carbonizing gas 63, the reducing gas 64, and the inert gas 65 from the respective gas cylinders into the process chamber 34 in the desired proportions, at the desired timing, and at the desired rate. However, in other embodiments, some or all of the gasses may be "premixed" and provided in one or more cylinders for delivery to the process chamber 34.

According to embodiments of the invention, the carbonizing gas 63 may be carbon monoxide gas, the reducing gas 64 may be hydrogen gas, and the inert gas 65 may be argon or nitrogen gas. However, it is understood that any suitable carbonizing gas 63, reducing gas 64, inert gas 65, or mixture thereof, may be used according to the teachings of the invention. For example, in other embodiments, the process gas 62 may instead comprise methane gas instead of separate reducing and carbonizing gasses. The composition of the process gas 62 will depend on design considerations, such as the cost and availability of the gases, safety issues, and the desired rate of production, among other considerations.

Preferably, the process gas 62 is introduced into the process chamber 34 and directed through the cooling zone 23 and through each of the heating zones 20, 21, and 22, in a direction opposite (i.e., counter-current, as illustrated by arrow 28) to the direction 26 that the precursor material 14 is moved through each of the heating zones 20, 21, and 22 of the furnace 16, and through the cooling zone 23. Directing the process gas 62 through the furnace 16 in a direction that is opposite or counter-current 28 to the direction 26 that the precursor material 14 is moving through the furnace 16 may increase the rate of the reaction of the precursor material 14 and the intermediate material 30 (FIG. 2) with the process gas 62. That is, the process gas 62 comprises higher concentrations of the reducing gas 64 and the carbonizing gas 63 when it is initially introduced to the process chamber 34 and is thus likely to more readily react with the remaining or unreacted portion of the precursor material 14 and/or the intermediate material 30 at the far end of the process chamber 34.

The unreacted process gas 62 that flows upstream toward the entry of the process chamber 34 thus comprises a lower concentration of the carbonizing gas 63 and the reducing gas 64. However, presumably a larger surface area of unreacted precursor material 14 is available at or near the entry of the process chamber 34. As such, smaller concentrations of carbonizing gas 63 and reducing gas 64 may be required to react with the precursor material 14 at or near the entry of the process chamber 34. In addition, introducing the process gas 62 in such a manner may enhance the efficiency with which the carbonizing gas 63 and the reducing gas 64 is consumed by the reaction therebetween, for reasons similar to those just explained.

It is understood that in other embodiments of the invention the process gas 62 may be introduced in any other suitable manner. For example, the process gas 62 may be introduced through multiple injection sites (not shown) along the length of the process chamber 34. Or for example, and as explained above, the process gas 62 may be premixed and stored in its combined state in one or more gas cylinders for introduction into the furnace 16. These are merely exemplary embodiments, and still other embodiments are also contemplated as being within the scope of the invention.

The process gas 62 may also be used to maintain the internal or reaction portion of the process chamber 34 at a substantially constant positive pressure, as is desired according to preferred embodiments of the invention to exclude any oxygen from the process chamber 34 in case of a leak. Indeed, according to one embodiment of the invention, the process chamber 34 is maintained at about 8.9 cm to 12.7 cm (3.5 in to 5 in) of water pressure (gauge), and preferably at about 11.4 cm (4.5 in) of water pressure (gauge). The process chamber 34 may be maintained at a constant pressure, according to one embodiment of the invention, by introducing the process gas 62 at a predetermined rate, or pressure, into the process chamber 34, and discharging the unreacted process gas 62 at a predetermined rate, or pressure, therefrom to establish the desired equilibrium pressure within the process chamber 34.

Preferably, the process gas 62 (i.e., the unreacted carbonizing gas 63 and the unreacted reducing gas 64) is discharged from the process chamber 34 through a scrubber 66 at or near the entry of the process chamber 34 to maintain the process chamber 34 at a substantially constant pressure. The scrubber 66 may comprise a dry pot 67, a wet pot 68, and a flare 69. The dry pot 67 is preferably provided upstream of the wet pot 68 for collecting any dry material that may be discharged from the process chamber 34 to minimize contamination of the wet pot 68. The process gas 62 is discharged through the dry pot 67 and into water contained in the wet pot 68. The depth of the water that the process gas 62 is discharged into within the wet pot 68 controls the pressure of the process chamber 34. Any excess gas may be burned at the flare 69.

Other embodiments for maintaining the process chamber 34 at a substantially constant pressure are also contemplated as being within the scope of the invention. For example, a discharge aperture (not shown) may be formed within a wall 74 (FIG. 2) of the process chamber 34 for discharging the unreacted process gas 62 from the process chamber 34 to maintain the desired pressure therein. Or for example, one or more valves (not shown) may be fitted into a wall 74 (FIG. 2) of the process chamber 34 for adjustably releasing or discharging the unreacted process gas 62 therefrom. Yet other embodiments for maintaining the pressure within the process chamber 34 are also contemplated as being within the scope of the invention.

The various components of apparatus 10, such as are shown in FIG. 1 and described in the immediately preceding discussion, are commercially available. For example, a Harper Rotating Tube Furnace (Model No. HOU-6D60-RTA-28-F), is commercially available from Harper International Corporation (Lancaster, N.Y.), and may be used according to the teachings of the invention, at least in part, to produce molybdenum carbide product 12.

The Harper Rotating Tube Furnace features a high-heat chamber with a maximum temperature rating of 1450° C. A number of refractory dams divide the high-heat chamber into three independent temperature control zones. The three temperature control zones feature discrete temperature control using twenty-eight silicon-carbide electrical resistance heating elements. Thermocouplers are provided at the center of each control zone along the centerline of the roof of the furnace. The temperature control zones are regulated by three Honeywell UDC3000 Microprocessor Temperature Controllers, and by three Honeywell UDC2000 Microprocessor Temperature Limiters, each commercially available from Honeywell International, Inc. (Morristown, N.J.).

The Harper Rotating Tube Furnace also features a gas-tight, high temperature alloy process chamber, having a maximum rating of 1100° C. The process chamber has a nominal internal diameter of 15.2 cm (6.0 in), nominal external ends diameter of 16.5 cm (6.5 in), and an overall length of 305 cm (120 in). The process chamber extends in equal segments (each having a length of 50.8 cm (20 in)) through each of the temperature control zones, leaving 152 cm (60 in) extending through the cooling zone.

The process chamber provided with the Harper Rotating Tube Furnace may be inclined within a range of 0 to 5°. In addition, the Harper Rotating Tube Furnace may be provided with a variable direct current (DC) drive with digital speed control for rotating the process chamber at rotational speeds of one to five revolutions per minute (rpm).

The Harper Rotating Tube Furnace also features a 316-liter, stainless steel, gas-tight with inert gas purge, discharge hopper. The Harper Rotating Tube Furnace also features an atmosphere process gas control system for maintaining a constant pressure within the process chamber. In addition, a 45-kilowatt (kW) power supply may be provided, for heating the furnace and driving the process chamber. In addition, the Harper Rotating Tube Furnace may be fitted with a Brabender Loss-In-Weight Feed System (Model No. H31-FW33/50), commercially available from C. W. Brabender Instruments, Inc. (South Hackensack, N.J.).

Although preferred embodiments of apparatus 10 are shown in FIG. 1 and have been described above, it is understood that other embodiments of apparatus 10 are also contemplated as being within the scope of the invention. In addition, it is understood that apparatus 10 may comprise any suitable components from various manufacturers, and are not limited to those provided herein. Indeed, where apparatus 10 is designed for large or industrial-scale production, the various components may be specifically manufactured therefor, and the specifications will depend on various design considerations, such as but not limited to, the scale thereof.

Method for Producing Molybdenum Carbide

Having described apparatus 10, and preferred embodiments thereof, that may be used to produce molybdenum carbide product 12 according to the invention, attention is now directed to embodiments of a method for producing molybdenum carbide product 12. As an overview, and still with reference to FIG. 1, the precursor material 14 is preferably introduced into the furnace 16 and moved through the heating zones 20, 21, and 22, and the cooling zone 23 thereof. The process gas 62 is preferably introduced into the furnace 16 for reaction with the precursor material 14 and the intermediate material 30. The precursor material 14 and the intermediate material 30 react with the process gas 62 therein to produce molybdenum carbide product 12 (i.e., MoC and/or $Mo_2C$), as discussed in more detail below with respect to preferred embodiments of the method.

According to preferred embodiments, the precursor material 14 comprises nano-particles of molybdic oxide ($MoO_3$). The nano-particles of molybdic oxide preferably have a typical surface area to mass ratio of about 25 to 35 $m^2/g$. These nano-particles of molybdic oxide may be produced according to embodiments of the invention disclosed in co-owned, co-pending U.S. patent application Ser. No. 09/709,838 filed on Nov. 9, 2000 for "METHOD AND APPARATUS FOR PRODUCING NANO-PARTICLES OF MOLYBDENUM OXIDE" of Khan, et al., which is incorporated herein for all that it discloses. The nano-particles of molybdic oxide are produced by, and are commercially available from the Climax Molybdenum Company (Fort Madison, Iowa).

According to other embodiments of the invention, however, it is understood that the precursor material 14 may comprise any suitable grade or form of molybdic oxide ($MoO_3$). For example, the precursor material 14 may range in size from 0.5 to 80 $m^2/g$. In yet other embodiments of the invention, the precursor material 14 may comprise other materials, such as ammonium molybdate, hydrogen-based molybdates, etc. Selection of the precursor material 14 may depend on various design considerations, including but not limited to, the desired characteristics of the molybdenum carbide product 12 (e.g., surface area to mass ratio, size, purity, etc.).

In general, the surface area to mass ratio of the molybdenum carbide product 12 is proportionate to the surface area to mass ratio of the precursor material 14. When molybdic oxide precursor material is used according to the teachings of the invention, the surface area to mass ratio of the molybdenum carbide product 12 typically ranges from 5 to 11 $m^2/g$.

Figure 2:
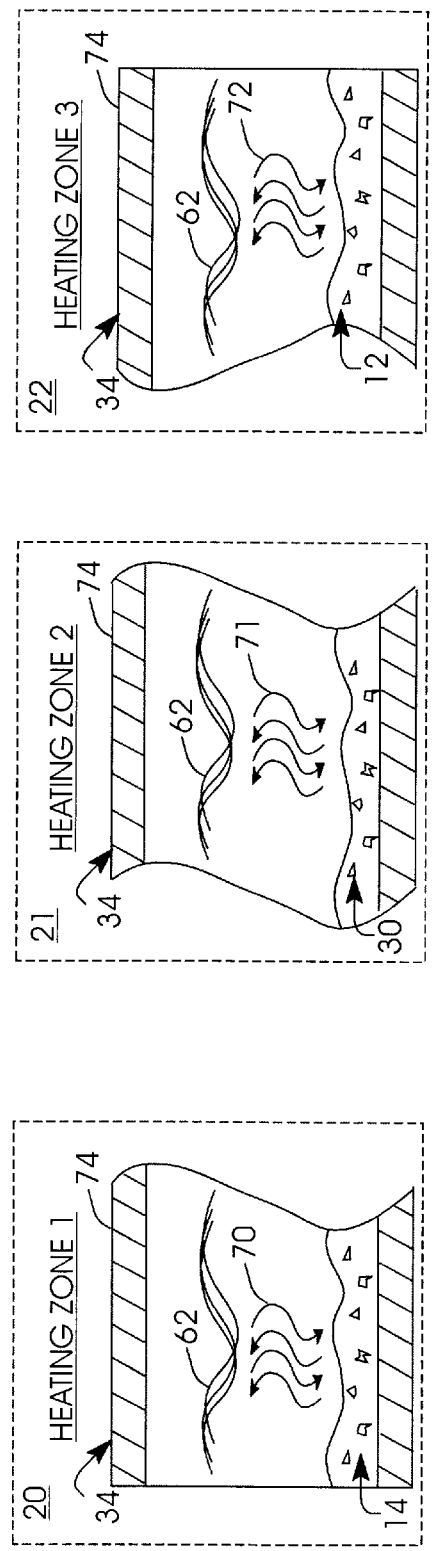
FIG. 2 is a cross-sectional view of three sections of a process chamber illustrating molybdenum carbide production.

Turning now to FIG. 2, the process chamber 34 (walls 74 thereof are shown) is illustrated in three cross-sectional portions of the process chamber 34. Each cross-sectional portion shown in FIG. 2 is taken respectively from each of the three heating zones 20, 21, and 22 of the furnace 16. According to preferred embodiments of the method, the precursor material 14 is introduced into the process chamber 34, and moves through each of the three heating zones 20, 21, and 22 of the furnace 16 (i.e., Heating Zone 1, Heating Zone 2, and Heating Zone 3, in FIG. 2) The process chamber 34 may be rotating and/or inclined to facilitate movement and mixing of the precursor material 14 therein, as described in more detail above with respect to embodiments of apparatus 10. In addition, the process gas 62 is also introduced into the process chamber 34. Preferably, the process gas 62 flows through the process chamber 34 in a direction 28 that is opposite or counter-current to the direction 26 that the precursor material 14 is moving through the process chamber 34, such as may be accomplished according to the embodiments of apparatus 10 discussed in more detail above.

As the precursor material 14 moves through the heating zones 20, 21, and 22, it is mixed with the process gas 62 and reacts therewith to form intermediate product 30, and then the molybdenum carbide product 12. The reaction is illustrated by arrows 70, 71, and 72 in the respective heating zones 20 (Heating Zone 1), 21 (Heating Zone 2), and 22 (Heating Zone 3) of FIG. 2. More particularly, the reactions may be described as solid molybdic oxide ($MoO_3$) being reduced by the reducing gas 64 (e.g., hydrogen gas), and carbonized by the carbonizing gas 63 (e.g., carbon monoxide gas).

The temperature in the first heating zone 20 is preferably maintained below the vaporization temperature of the precursor material 14, and that of any intermediate material 30 that is formed in the first heating zone 20 (Heating Zone 1), relative to the pressure within the process chamber 34. Overheating the precursor material 14 and/or the intermediate material 30 may cause a reaction only on the surface thereof. The resulting surface reaction may seal unreacted precursor material 14 and/or intermediate material 30 therein. Thus, longer processing times and/or higher processing temperatures may be required to convert these "beads" to molybdenum carbide product 12, thus reducing the efficiency and increasing the cost of production.

The temperature of the first heating zone 20 is preferably maintained at a lower temperature than the other two heating zones 21, and 22 because the reaction between the precursor material 14 and the process gas 62 in the first heating zone 20 (Heating Zone 1) is an exothermic reaction. That is, heat is released during the reaction in the first heating zone 20.

The reaction between the intermediate material 30 and the process gas 62 in the third heating zone 22 (Heating Zone 3) is an endothermic reaction. That is, heat is consumed during this reaction. Therefore, the energy input of the third heating zone 22 is preferably adjusted accordingly to provide the additional heat required by the endothermic reaction in the third heating zone 22.

When the molybdenum carbide 12 produced by the reactions described above is immediately introduced to an atmospheric environment while still hot (e.g., upon exiting the third heating zone 22), it may react with one or more constituents of the atmosphere. Therefore, the molybdenum carbide product 12 is preferably moved through a cooling zone 23 in a reducing environment (e.g., the process gas 62 flows through the cooling zone 23). Accordingly, the hot molybdenum carbide product 12 may be cooled for handling purposes before being exposed to the atmosphere.

The reactions shown in each of the heating zones 20, 21, and 22 in FIG. 2 are merely illustrative of the process of the invention. As will be readily apparent to one skilled in the art, it is understood that one or more reactions may occur in each of (the three heating zones 20, 21, and 22, as illustrated by arrows 70, 71, and 72. Indeed, some molybdenum carbide product 12 may be formed in the first heating zone 20 and/or the second heating zone 21. Likewise, some unreacted precursor material 14 may be introduced into the second heating zone 21 and/or the third heating zone 22. In addition, some reactions may still occur even in the cooling zone 23.

Also as will be readily apparent to one skilled in the art, any unreacted process gas 62 is discharged in the effluent. Likewise, where the reducing agent combines with oxygen stripped from the molybdic oxide and/or combines with the unreacted carbonizing gas, these may also be released in the effluent.

Having discussed the reactions in the furnace 16 illustrated in FIG. 2, it should be noted that optimum conversion of the precursor material 14 to the molybdenum carbide product 12 were observed to occur when the process parameters were set to values in the ranges shown in Table 1.

TABLE 1

| PARAMETER | SETTING |
| --- | --- |
| Process Chamber Incline | 0.15° to 1.0° |
| Process Chamber Rotation Rate | 15 to 35 seconds per revolution |
| Temperature (for MoC) | |
| Zone 1 | 540° C. to 590° C. |
| Zone 2 and Zone 3 | 820° C. to 940° C. |
| Zone 3 | 880° C. to 950° C. |
| Temperature (for $Mo_2C$) | |
| Zone 1 | 540° C. to 590° C. |
| Zone 2 and Zone 3 | 760° C. to 820° C. |
| Zone 3 | 980° C. to 1040° C. |
| Reducing Gas Flow Rate | 15 to 50 cubic feet per hour |
| Carbonizing Gas Flow Rate | 15 to 50 cubic feet per hour |

The gas flow rates of the reducing gas and of the carbonizing gas are preferably in equal proportion to one another, or within about 5 cubic feet per hour of equal flow rates.

It is understood that molybdenum carbide product 12 may also be produced when the process parameters are adjusted outside of the ranges given above in Table 1, as may be readily determined by one skilled in the art based on the teachings of the invention.

According to preferred embodiments of the invention, it is not necessary to screen the molybdenum carbide product 12 to remove precursor material 14, intermediate material 30, and/or other contaminating material (not shown) from the product. That is, preferably, 100% of the precursor material 14 is fully converted to pure molybdenum carbide product 12. However, according to embodiments of the invention, the molybdenum carbide product 12 may be screened to remove oversize particles from the product that may have agglomerated during the process. Whether the molybdenum carbide product 12 is screened will depend on design considerations such as, but not limited to, the ultimate use for the molybdenum carbide product 12, the purity and/or particle size of the precursor material 14, etc.

Figure 3:
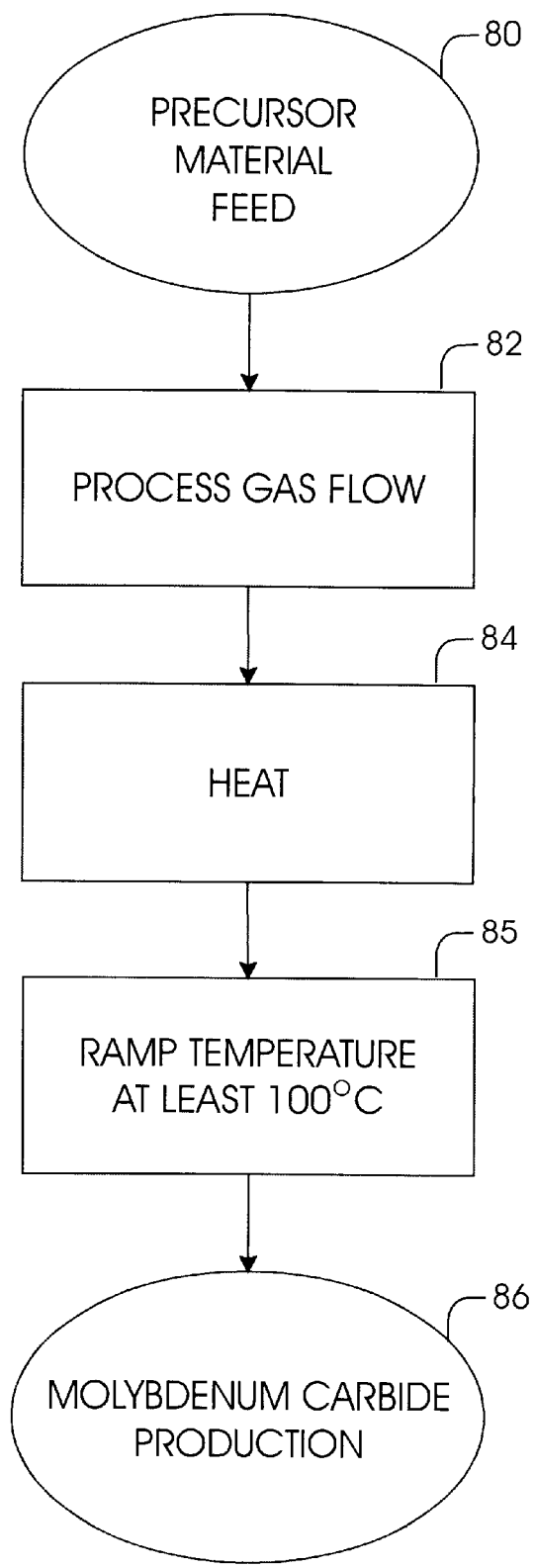
FIG. 3 is a flow chart illustrating an embodiment of a method for producing molybdenum carbide according to the invention.

An embodiment of a method for producing molybdenum carbide 12 according to the teachings of the invention is illustrated as steps in the flow chart shown in FIG. 3. In step 80, the precursor material 14 may be introduced into the reaction chamber (e.g., process chamber 34 of furnace 16). As discussed above, the precursor material 14 is preferably introduced into the furnace 16 by feeding it into the process chamber 34 extending through the furnace 16. In step 82, the process gas 62 may be introduced into the reaction chamber (e.g., process chamber 34 of furnace 16). Again, as discussed above, the process gas 62 is preferably introduced into the process chamber 34 and preferably flows therethrough in a direction 28 that is opposite or counter-current to the direction 26 that the precursor material 14 is moving through the furnace 16. In step 84, the three heating zones of the reaction chamber are heated and the precursor material moved through the heating zones 20, 21, and 22. Accordingly, the precursor material 14 is converted to molybdenum carbide 12, as illustrated by step 86 and described in more detail above with respect to FIG. 2.

It is understood that the steps shown and described with respect to FIG. 3 are merely illustrative of an embodiment of the method for producing molybdenum carbide 12. It is expected that yet other embodiments of the method for producing molybdenum carbide product that are within the scope of the invention will become readily apparent to one skilled in the art based on the teachings of the invention.

EXAMPLES

In the following examples, the precursor material comprised nano-particles of molybdic oxide ($MoO_3$) having a typical size of about 25 to 35 $m^2/g$. Such nano-particles of molybdic oxide may be produced according to embodiments of the invention disclosed in co-owned, co-pending U.S. patent application for "METHOD AND APPARATUS FOR PRODUCING NANO-PARTICLES OF MOLYBDENUM OXIDE". The nano-particles of molybdic oxide used as precursor material in this example are produced by and are commercially available from the Climax Molybdenum Company (Fort Madison, Iowa).

The following equipment was used for this example: a Brabender Loss-In-Weight Feed System (Model No. H31-FW33/50), commercially available from C. W. Brabender Instruments, Inc. (South Hackensack, N.J.); and a Harper Rotating Tube Furnace (Model No. HOU-6D60-RTA-28-F), commercially available from Harper International Corporation (Lancaster, N.Y.). The Harper Rotating Tube Furnace comprised three independently controlled 50.8 cm (20 in) long heating zones with a 305 cm (120 in) HT alloy tube extending through each of the heating zones thereof. Accordingly, a total of 152 cm (60 in) of heating and 152 cm (60 in) of cooling were provided in this example.

The precursor material was fed at a rate of about five to seven grams per minute using the Brabender Loss-In-Weight Feed System into the HT alloy tube of the Harper Rotating Tube Furnace. The carbonizing gas and the reducing gas were each introduced through the HT alloy tube at a rate of 30 cubic feet per hour in a direction opposite or counter-current to the direction that the precursor material was moving through the HT alloy tube. In this example, the process gas comprised carbon monoxide as the carbonizing gas and hydrogen gas as the reducing gas. Nitrogen gas was used to purge the process chamber. Alternatively, argon gas was also used to purge the process chamber. The discharge gas was bubbled through a water scrubber to maintain the interior of the furnace at approximately 11.4 cm (4.5 in) of water pressure (gauge).

Example 1

MOC Production

In Example 1, the HT alloy tube was rotated at about 20 seconds per revolution, and inclined about 0.250 to facilitate movement of the precursor material through the Harper Rotating Tube Furnace, and to facilitate mixing of the precursor material with a process gas. Optimum conversion of the precursor material to molybdenum carbide (MoC) product in one pass through the furnace occurred when the temperature of the first heating zone (Heating Zone 1) was set to about 555° C., and the temperature of the second and third heating zones (Heating Zone 2 and Heating Zone 3) were each set to about 900° C. Accordingly, the reactants were heated to 555° C. for approximately one-third of the processing time (i.e., based on one-third of the overall process chamber length) and heated to 900° C. for approximately two-thirds of the processing time (i.e., based on two-thirds of the overall process chamber length).

Molybdenum carbide (MoC) produced according to this example is characterized by a surface area to mass ratio of 11.5 to 14 $m^2/g$.

Example 2

$Mo_2C$ Production

In Example 2, the HT alloy tube was rotated at about 28 seconds per revolution, and inclined about 0.50 to facilitate movement of the precursor material through the Harper Rotating Tube Furnace, and to facilitate mixing of the precursor material with a process gas. Optimum conversion of the precursor material to molybdenum carbide ($Mo_2C$) product in one pass through the furnace occurred when the temperature of the first heating zone (Heating Zone 1) was set to about 555° C., the temperature of the second heating zone (Heating Zone 2) was set to about 800° C., and the temperature of the third heating zone (Heating Zone 3) was set to about 1000° C.

Molybdenum carbide ($Mo_2C$) produced according to this example is characterized by a surface area to mass ratio of 5 to 11 $m^2/g$.

It is readily apparent that apparatus and methods for production of molybdenum carbide (MoC and $Mo_2C$) discussed herein may be used to produce molybdenum carbide in a continuous, single stage manner. Consequently, the claimed invention represents an important development in molybdenum carbide technology. Having herein set forth various and preferred embodiments of the invention, it is expected that suitable modifications will be made thereto which will nonetheless remain within the scope of the invention. Accordingly, the invention should not be regarded as limited to the embodiments shown and described herein, and it is intended that the appended claims be construed to include yet other embodiments of the invention, except insofar as limited by the prior art.

What is claimed is:

1. A method for producing molybdenum carbide, comprising:
    heating a precursor material in a first heating zone in the presence of a reducing gas and a carbonizing gas, the first heating zone having a first temperature; and
    moving the precursor material into a second heating zone to form the molybdenum carbide from the precursor material, the second heating zone having a second temperature, the second temperature being at least 100° C. hotter than the first temperature.

2. The method of claim 1, wherein the first temperature is about 555° C. and the second temperature is about 900° C.

3. The method of claim 1, further comprising moving the precursor material into a third heating zone, the third heating zone having a third temperature.

4. The method of claim 3, wherein the first temperature is in a range of about 540° C. to 590° C., the second temperature is in a range of about 820° C. to 940° C., and the third temperature is in a range of about 880° C. to 950° C.

5. The method of claim 4, wherein the molybdenum carbide produced is MoC.

6. The method of claim 3, wherein the first temperature is in a range of about 540° C. to 590° C., the second temperature is in a range of about 760° C. to 820° C., and the third temperature is in a range of about 980° C. to 1040° C.

7. The method of claim 6, wherein the first temperature is about 555° C., the second temperature is about 800° C., and the third temperature is about 1000° C.

8. The method of claim 6, wherein the molybdenum carbide produced is $Mo_2C$.

9. The method of claim 1, wherein the precursor material is in the first heating zone for a first time, and the precursor material is in the second heating zone for a second time.

10. The method of claim 9, wherein the first time is about the same as the second time.

11. The method of claim 9, wherein the first time is about half of the second time.

12. The method of claim 1, further comprising cooling the molybdenum carbide in the presence of the reducing gas and the carbonizing gas.

13. The method of claim 1, further comprising cooling the molybdenum carbide at a substantially constant pressure.

14. The method of claim 1, further comprising mixing the precursor material with the reducing gas and the carbonizing gas to facilitate reaction of the precursor material, the reducing gas, and the carbonizing gas.

15. The method of claim 1, wherein heating the precursor material is performed at a substantially constant pressure.

16. The method of claim 1, wherein heating the precursor material is performed at a pressure of about 11.4 cm of water pressure (gauge).

17. The method of claim 1, further comprising introducing the precursor material into the first and second heating zones in a first direction, and introducing the reducing gas and the carbonizing gas in a second direction, said first direction being opposite said second direction.

18. The method of claim 1, further comprising introducing the reducing gas and the carbonizing gas at substantially equal rates on a volume basis.

19. The method of claim 1, further comprising introducing the reducing gas and the carbonizing gas each at about 30 cubic feet per hour and feeding the precursor material at about 5 to 7 grams per minute.

* * * * *

UNITED STATES PATENT AND TRADEMARK OFFICE
CERTIFICATE OF CORRECTION

PATENT NO. : 6,746,656 B2
DATED : June 8, 2004
INVENTOR(S) : Mohamed H. Khan et al.

It is certified that error appears in the above-identified patent and that said Letters Patent is hereby corrected as shown below:

Title page,
Item [*] Notice, please delete "162" and insert therefor -- 150 --.

Signed and Sealed this

Sixth Day of September, 2005

JON W. DUDAS
*Director of the United States Patent and Trademark Office*